United States Patent
Garner et al.

(10) Patent No.: US 10,609,858 B2
(45) Date of Patent: Apr. 7, 2020

(54) COMMODITY METERING SYSTEM FOR WORK VEHICLE AND CALIBRATION METHOD FOR SAME

(71) Applicant: Deere & Company, Moline, IL (US)

(72) Inventors: Elijah B. Garner, Bettendorf, IA (US); Jonathan T. Miller, Davenport, IA (US); Stanley R. Borkgren, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 376 days.

(21) Appl. No.: 15/711,805

(22) Filed: Sep. 21, 2017

(65) Prior Publication Data
US 2019/0082583 A1 Mar. 21, 2019

(51) Int. Cl.
*A01C 7/08* (2006.01)
*A01C 7/10* (2006.01)

(52) U.S. Cl.
CPC ............ *A01C 7/081* (2013.01); *A01C 7/105* (2013.01); *A01C 7/107* (2013.01)

(58) Field of Classification Search
CPC ..................................................... A01C 7/081
See application file for complete search history.

(56) References Cited

U.S. PATENT DOCUMENTS

| 4,896,615 | A | 1/1990 | Hood, Jr. et al. |
| 5,684,476 | A | 11/1997 | Anderson |
| 5,845,818 | A | 12/1998 | Gregor et al. |
| 8,132,521 | B2 | 3/2012 | Snipes et al. |
| 8,281,724 | B2 | 10/2012 | Snipes |
| 8,434,416 | B2 | 5/2013 | Kowalchuk et al. |
| 8,678,347 | B2 | 3/2014 | Maro |
| 9,591,799 | B2 | 3/2017 | Henry |
| 10,379,547 | B2* | 8/2019 | Thompson ........... G05D 7/0605 |
| 2012/0226461 | A1* | 9/2012 | Kowalchuk ............ A01C 7/107 702/100 |
| 2013/0340610 | A1 | 12/2013 | Maro |
| 2016/0120107 | A1* | 5/2016 | Chahley ................. A01C 7/107 406/29 |
| 2019/0000011 | A1* | 1/2019 | Gervais ................ A01C 21/005 |

(Continued)

OTHER PUBLICATIONS

New Holland, Product Calibration Procedures, 5 Working Operations Excerpt, undated admitted art.

(Continued)

*Primary Examiner* — Manuel L Barbee
*Assistant Examiner* — Raymond L Nimox
(74) *Attorney, Agent, or Firm* — Klintworth & Rozenblat IP LLP

(57) ABSTRACT

A method includes performing a plurality of calibration routines in which a metering element operates at different speeds. The method also includes receiving a respective plurality of measurements of commodity amounts metered out during the calibration routines. The method further includes generating a calibration factor for operating the metering element based on data generated from the measurements taken from the calibration routines. Also, the method includes generating a control command for the metering element according to the calibration factor. The method additionally includes operating, by the control system, the metering element according to the control command.

20 Claims, 8 Drawing Sheets

(56) References Cited

U.S. PATENT DOCUMENTS

2019/0033895 A1\* 1/2019 Thompson ............ A01C 15/006
2019/0037764 A1\* 2/2019 Garner ................... A01C 7/102
2019/0082585 A1\* 3/2019 Felton .................... A01C 7/102
2019/0082586 A1\* 3/2019 Harmon ................. A01C 7/081

OTHER PUBLICATIONS

John Deere, 1910 Air Cart Hydraulic Drive Meter Calibration, http://www.youtube.com/wath?v=yNC-cYSZDva, Dec. 13, 2012.

\* cited by examiner

COMMODITY METERING SYSTEM FOR WORK VEHICLE AND CALIBRATION METHOD FOR SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and implements, and more specifically, to a commodity metering system for a work vehicle and a calibration method for the same.

BACKGROUND OF THE DISCLOSURE

Work vehicles, such as air seeders and other seeding devices, are configured for applying seed, fertilizer, and/or other particulate commodities to a field. The work vehicle may also include tilling equipment for applying the commodity under the surface of the soil.

Work vehicles typically include one or more tanks and a metering system that meters out a predetermined quantity of the commodity from the tank as the work vehicle moves across the field. The metered particles may move into a high velocity airstream generated by an airflow system of the vehicle. Once in the airstream, the particles are delivered to the soil. Alternatively, the metered particles may fall to the soil under the force of gravity.

SUMMARY OF THE DISCLOSURE

This disclosure provides an improved metering system and methods for calibrating the metering system.

In one aspect, the disclosure provides a method of calibrating a metering system for a work vehicle. The method includes performing, by a control system having at least one processor, a first calibration routine in which a metering element operates at a first speed, a second calibration routine in which the metering element operates at a second speed, and a third calibration routine in which the metering element operates at a third speed. The method also includes receiving, by the control system, a first measurement related to a first amount of a commodity metered out by the metering element during the first calibration routine, a second measurement related to a second amount of the commodity metered out by the metering element during the second calibration routine, and a third measurement related to a third amount of the commodity metered out by the metering element during the third calibration routine. Moreover, the method includes generating, by the control system, first data correlating the first measurement to the first speed, second data correlating the second measurement to the second speed, and third data correlating the third measurement to the third speed. Additionally, the method includes determining, by the control system, a calibration factor for operating the metering element based on the first data, the second data, and the third data. Also, the method includes generating, by the control system, a control command for the metering element according to the calibration factor. Also, the method includes operating, by the control system, the metering element according to the control command.

In another aspect, a work vehicle is disclosed that includes a metering system that includes a metering element configured to meter a commodity through the metering system. The work vehicle also includes a sensor system and a control system with at least one processor. The control system is configured to perform a first calibration routine in which the metering element operates at a first speed, a second calibration routine in which the metering element operates at a second speed, and a third calibration routine in which the metering element operates at a third speed. The control system is also configured to receive a first measurement, a second measurement, and a third measurement from the sensor system. The first measurement is related to a first amount of a commodity metered out by the metering element during the first calibration routine, the second measurement is related to a second amount of the commodity metered out by the metering element during the second calibration routine, and the third measurement is related to a third amount of the commodity metered out by the metering element during the third calibration routine. The control system is further configured to generate first data correlating the first measurement to the first speed, second data correlating the second measurement to the second speed, and third data correlating the third measurement to the third speed. Moreover, The control system is also configured to determine a calibration factor for operating the metering element based on the first data, the second data, and the third data. Also, the control system is configured to generate a control command for the metering element according to the calibration factor. Furthermore, the control system is configured to operate the metering element according to the control command.

In an additional aspect, the disclosure provides a method of calibrating a metering system for a work vehicle. The metering system includes an electric motor and a metering roller. The method includes performing, by a control system having at least one processor, a first calibration routine in which the metering roller rotates at a first angular speed, a second calibration routine in which the metering roller rotates at a second angular speed, and a third calibration routine in which the metering roller rotates at a third angular speed. The method also includes receiving, by the control system from a scale of the work vehicle, a first weight of a first amount of a commodity metered out by the metering roller during the first calibration routine, a second weight of a second amount of the commodity metered out by the metering element during the second calibration routine, and a third weight of a third amount of the commodity metered out by the metering element during the third calibration routine. Additionally, the method includes generating, by the control system, first data correlating the first weight to the first angular speed, second data correlating the second weight to the second angular speed, and third data correlating the third weight to the third angular speed. Furthermore, the method includes determining, by the control system, a calibration factor for operating the electric motor and the metering roller based on the first data, the second data, and the third data. The method additionally includes storing, in a memory element, the calibration factor. The method further includes generating, by the control system, a control command for the electric motor according to the stored calibration factor and rotating the metering roller according to the control command.

The details of one or more embodiments are set forth in the accompanying drawings and the description below.

Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
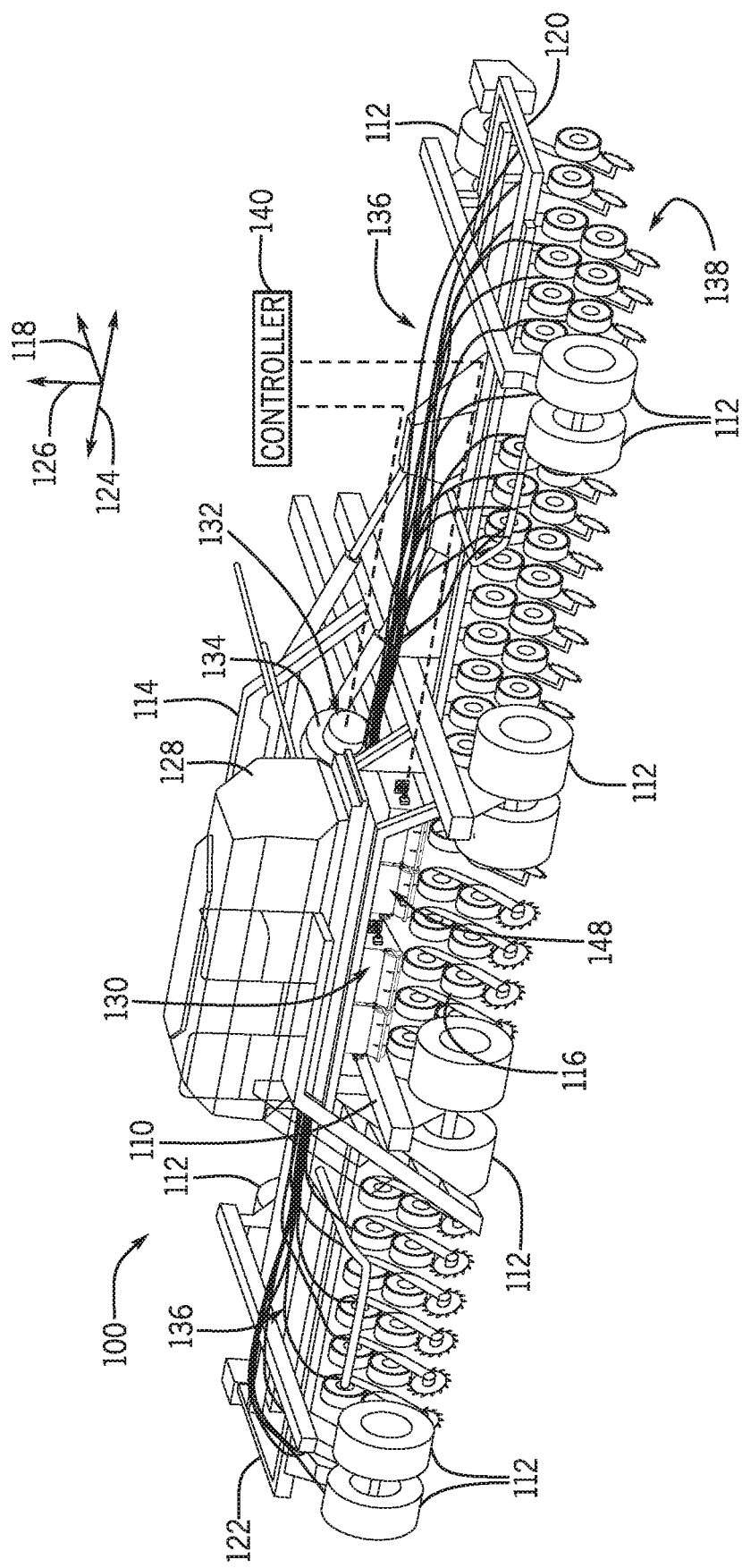
FIG. 1 is a rear perspective view of a work vehicle according to example embodiments of the present disclosure.

The following describes one or more example embodiments of a commodity metering system for a work vehicle (e.g., an air cart, commodity cart, etc.), its control system(s), and the methods for operating the same, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicle described herein is merely one exemplary embodiment of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As will be appreciated by one skilled in the art, certain aspects of the disclosed subject matter may be embodied as a method, system, or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The following describes one or more example implementations of the disclosed work vehicle for metering and delivering a commodity to the soil, as shown in the accompanying figures of the drawings described briefly above. The work vehicle may include a metering system with at least one metering element. The metering element may include a metering roller in some embodiments. One or more components of the metering element may actuate (e.g., rotate) at a variable output speed. The work vehicle may also include a control system configured to control the metering element by varying its output speed.

In some cases, the metering system may be calibrated to ensure that the metering element is metering out the intended amount of commodity during operation. To calibrate the system, in some embodiments, the metering element may be operated under predetermined conditions (e.g., at a known speed, a known number of revolutions, for a known amount of time, etc.). Then, the amount of commodity metered out under these conditions may be measured (e.g., weighed). This information allows the user to quantify the performance of the particular metering system. Data from this calibration method can be gathered and stored. This calibration method may be repeated. In some embodiments, the metering element may be operated under different predetermined conditions (e.g., at a different speed). The metered amount may be measured and the measurement data may be collected and stored. The collection of data from these methods may be used to generate a calibration factor for the metering element. Then, once the metering element has been calibrated, the control system may rely at least partly on the calibration factor for operating the metering element.

The metering system of the present disclosure and its method of use may provide substantial improvements in calibration accuracy. As mentioned, the calibration process may generate a substantial amount of data, which characterizes and quantifies the operation of the metering element at different speeds. Accordingly, operations of the metering element may be quantified with a high degree of accuracy.

Also, the following describes one or more features that facilitate calibration of the metering system. For example, a scale, load cell, or other measuring device may be included. In some embodiments, the scale may be mounted and supported on the work vehicle. A receptacle, such as a bag may be supported on the scale. Then, a user interface may be used to run a calibration program. During the program, the control system may automatically run the metering element through the calibration process. Specifically, the control system may operate the metering element at the different speeds and automatically weigh the resultant metered amounts of the commodity. Also, data may be gathered and recorded automatically. The scale may also automatically tare the receptacle. Thus, calibrating the metering system may be accomplished quickly and conveniently.

FIG. 1 illustrates a work vehicle 100 according to example embodiments of the present disclosure. The work vehicle 100 may be towed by another vehicle, such as a tractor. Thus, the work vehicle 100 may be a towed work vehicle. In other embodiments, the work vehicle 100 of the present disclosure may be a self-propelled vehicle. In some embodiments, the work vehicle 100 may be an air cart or air drill. It will be appreciated that the illustrated work vehicle 100 is an example embodiment. One or more features of the present disclosure may be included on a different work vehicle, such as a planter, a commodity cart, or other work vehicle without departing from the scope of the present disclosure.

The work vehicle 100 includes a front end 114 and a rear end 116. The work vehicle 100 also includes a first side 120 and a second side 122. Generally, the work vehicle 100 may include a chassis 110 and a plurality of wheels 112. The chassis 110 may be a rigid frame that supports the components described in detail below. The wheels 112 may support the chassis 110 on terrain and enable movement of the vehicle 100 across the terrain.

A travelling direction 118 is indicated in FIG. 1 for reference purposes. It will be appreciated that a fore-aft axis of the work vehicle 100 (extending between the front end 114 and rear end 116) is parallel to the travelling direction 118. A lateral direction 124 is also indicated in FIG. 1, and it will be appreciated that a lateral axis of the work vehicle 100 (extending between the first side 120 and the second side 122) is parallel to the lateral direction 124. Furthermore, a vertical direction 126 is indicated in FIG. 1 for reference purposes.

Figure 2:
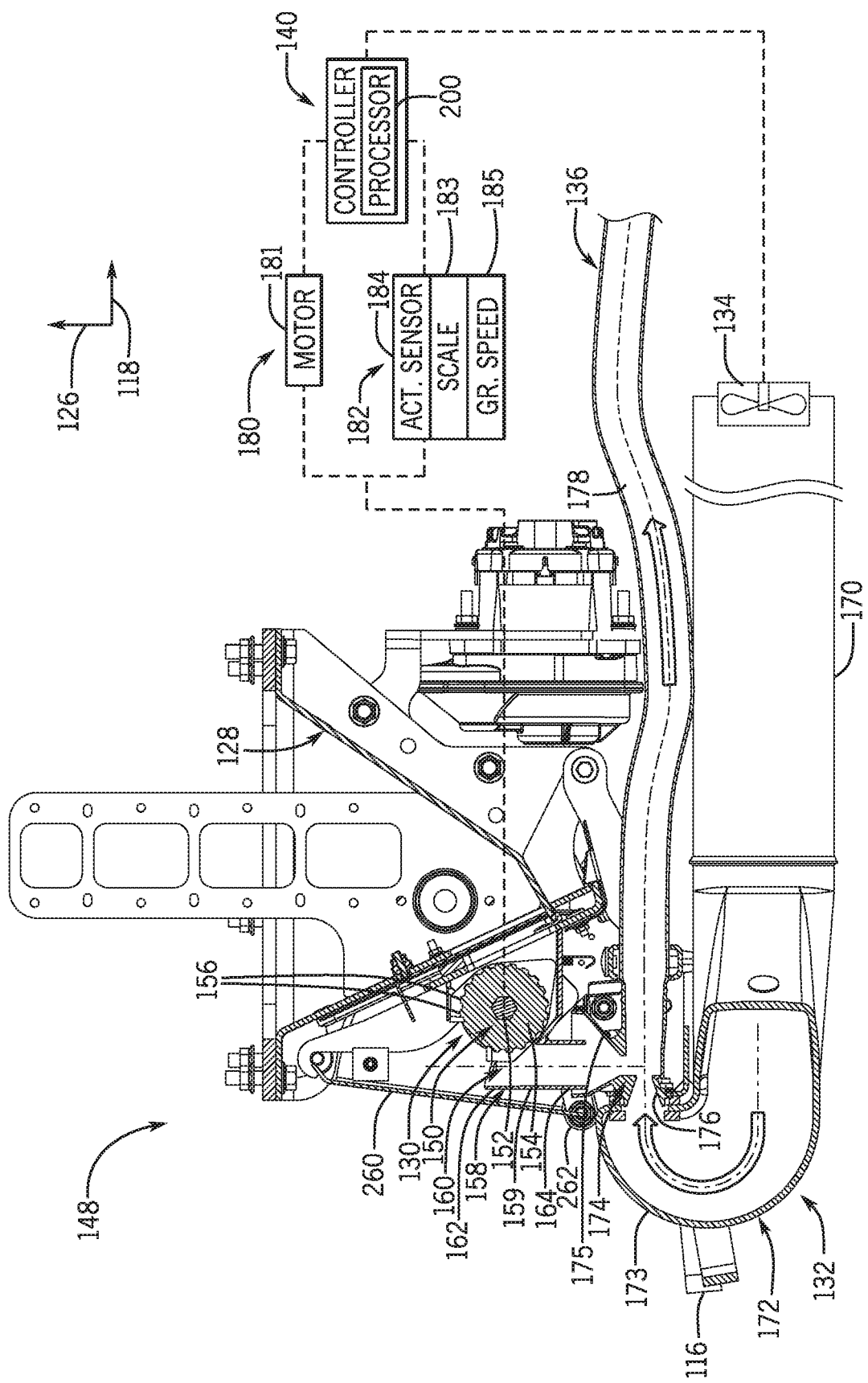
FIG. 2 is a section view of a metering system and an airflow system of the work vehicle of FIG. 1.

As shown in FIGS. 1 and 2, the work vehicle 100 may include one or more commodity containers 128. The container 128 may be supported on the chassis 110 and disposed proximate the rear end 116. Also, in some embodiments, the container 128 may be disposed centrally between the first side 120 and the second side 122. The commodity container 128 may contain seed, fertilizer, and/or another particulate or granular commodity.

Additionally, the work vehicle 100 may include a metering system 130. The metering system 130 may be a volumetric metering system. The metering system 130 may be disposed generally underneath the commodity container 128 in some embodiments. As such, particles of the commodity within the container 128 may fall due to gravity toward the metering system 130. The metering system 130 may operate to meter out the commodity from the container 128 at a controlled rate as the vehicle 100 moves across the field.

The work vehicle 100 may also include an airflow system 132. The airflow system 132 may include a fan 134 that generates a flow of air. The airflow system 132 may also include a plurality of airflow structures (e.g., plenums, tubes, lines, etc.) that receive the air blowing from the fan 134. Particles of the commodity (metered out by the metering system 130) may fall into the air stream and may flow to a distribution system 136. As shown in FIG. 1, the distribution system 136 may include a plurality of hoses, lines, or other conduits that extend to different areas of the vehicle 100 along the lateral direction 124. The particles of the commodity may be propelled by the airstream through the distribution system 136 toward the soil. The work vehicle 100 may also include a ground system 138 with openers, tillers or other similar implements that prepare the soil for delivery of the seed, fertilizer, or other commodity delivered by the distribution system 136.

Moreover, the work vehicle 100 may include a control system 140. The control system 140 may be in communication with and may be configured for controlling the metering system 130, the airflow system 132, and/or other components of the work vehicle 100. The control system 140 may be wholly supported on the work vehicle 100, or the control system 140 may include components that are remote from the vehicle 100. The control system 140 may be in electronic, hydraulic, pneumatic, mechanical, or other communication with the metering system 130, the airflow system 132, etc. In some embodiments, the control system 140 may also be in communication with actuators, sensors, and/or other components of the work vehicle 100.

During operation of the work vehicle 100 (e.g., when towed by a tractor or other towing vehicle across a field), the commodity may fall from the container 128 toward the metering system 130. The control system 140 may control the metering system 130 (e.g., by controlled actuation of a motor or other actuator), which allows a controlled quantity of particles to pass into the airflow system 132 at a predetermined rate. The control system 140 may also control the fan 134 for generating a continuous airstream that blows through the airflow system 132, receives the particles metered out from the metering system 130, and flows through the distribution system 136 across the work vehicle 100 to the soil.

In some embodiments, the metering system 130, the airflow system 132, the control system 140, and/or other parts of the work vehicle 100 may include features disclosed in U.S. patent application Ser. No. 15/670,834, filed Aug. 7, 2017, and entitled "WORK VEHICLE WITH COMMODITY METERING SYSTEM AND AIRFLOW SYSTEM", the entire disclosure of which is incorporated by reference.

Referring now to FIG. 2, the metering system 130, the airflow system 132, and the control system 140 will be discussed in greater detail according to example embodiments. A central assembly 148 of the work vehicle 100 is shown and other parts of the work vehicle 100 are hidden for clarity. The central assembly 148 may be supported on the chassis 110, proximate the rear end 116 of the vehicle 100. Also, in some embodiments, the central assembly 148 may define portions of the commodity container 128, the metering system 130, and/or the airflow system 132. As shown in FIG. 1, the work vehicle 100 may include plural central assemblies 148. For example, there may be four central assemblies 148 arranged end-to-end laterally across the work vehicle 100.

In some embodiments, the metering system 130 may be a volumetric metering system. However, the metering system 130 may be of a different configuration without departing from the scope of the present disclosure.

As shown, the metering system 130 may include a metering element 150. In some embodiments, the metering element 150 may comprise a rotatable metering element 150 (e.g., a metering roller) that provides volumetric metering as it rotates. The metering element 150 may be referred to as a roller or a roller cartridge. In some embodiments, the work vehicle 100 may include a rotatable metering element 150 for each of the central assemblies 148. Thus, in the embodiment shown in FIG. 1, there may be four rotatable metering elements 150 arranged laterally end-to-end across the work vehicle 100.

As shown in FIG. 2, the rotatable metering element 150 may include a shaft 152. The shaft 152 may have a relatively straight axis that extends laterally. The metering element 150 may also include a plurality of wheels 154 that are supported on the shaft 152. The wheels 154 may be spaced apart laterally along the shaft 152. The wheels 154 may include a plurality of projections 156 that project radially away from the wheel 154. Although the metering element 150 is shown as a fluted roller in FIG. 2, the metering element 150 could also be configured as an auger or configured otherwise in some embodiments of the present disclosure.

Furthermore, the metering system 130 may further include a plurality of commodity tubes 158. The commodity tubes 158 may be referred to as commodity cups. As an example, the commodity tube 158 may include a plurality of side walls 159 that define a passage 160. The passage 160 may have an open first end 162 and an open second end 164. The first end 162 of the commodity tube 158 may be disposed proximate the metering element 150 for receiving the commodity. The work vehicle 100 may include a plurality of commodity tubes 158, arranged along the lateral direction 124 across the work vehicle 100 and arranged along the axis of the rotatable metering element 150.

Thus, during operation of the metering system 130, the metering element 150 may rotate about the axis of the shaft 152. Commodity from the container 128 may fall onto the wheels 154 of the metering element 150. As the metering element 150 rotates, the commodity may fall from the wheels 154 and into the passages 160 of the commodity tubes 158. The commodity may fall through the passages 160 and exit the commodity tubes 158 through the second ends 164.

With continued reference to FIG. 2, the airflow system 132 will be discussed in greater detail. As mentioned above, the airflow system 132 may include a fan 134 that generates the airflow. The airflow system 132 may also include at least one upstream duct structure 170 that is fluidly connected to the fan 134 to receive airflow therefrom.

The airflow system 132 may further include at least one plenum assembly 172. In some embodiments, the work vehicle 100 may include a plenum assembly 172 for each central assembly 148. Thus, in the embodiment of FIGS. 1 and 2, there may be four plenum assemblies 172.

The plenum assembly 172 may include a plenum 173, which is fluidly connected to the upstream duct structure 170 to receive airflow therefrom. The plenum 173 may define a curved passage that directs air from the fan 134, which is blowing rearward, and turns the air forward.

The plenum assembly 172 may further include a plurality of venturi structures 174, one of which is represented in FIG. 2. The work vehicle 100 may include a plurality of venturi structures 174, arranged along the lateral direction 124 across the work vehicle 100 and along the axis of the rotatable metering element 150. There may be a venturi structure 174 for each commodity tube 158 in some embodiments.

As an example, the venturi structure 174 may include a funnel portion 175 that is disposed proximate the second end 164 of the respective commodity tube 158. The venturi structure 174 may also include at least one venturi tube 176. The venturi tube 176 may be fluidly connected to the funnel portion 175. Furthermore, an upstream end of the venturi tube 176 may be fluidly connected to the plenum 173. A downstream end of the venturi tube 176 may be fluidly connected to a tube 178 of the distribution system 136.

Accordingly, particles of the commodity that have been metered out by the metering system 130 may fall into the funnel portion 175 and into the venturi tube 176 of the venturi structure 174. The commodity may enter the air stream generated by the fan 134 and directed forward by the plenum 173. The commodity may accelerate through the tube 178 of the distribution system 136 and may be ultimately delivered to the soil.

With continued reference to FIG. 2, the control system 140 of the work vehicle will be discussed. The control system 140 may include and/or communicate with components of a computerized device, such as a processor 200, a data storage device, a user interface with a display and a keyboard or other related devices, etc.

The control system 140 may communicate with at least one actuator 180. In some embodiments, the actuator 180 may be operably connected to the metering system 130 for driving (e.g., rotating) the metering element 150. The actuator 180 may be of any suitable type, such as an electric motor 181 in some embodiments. However, it will be appreciated that the actuator 180 may be a hydraulic actuator or another type without departing from the scope of the present disclosure. Furthermore, in some embodiments, the work vehicle 100 may include a single actuator 180 for actuating each of the metering elements 150. In other embodiments, each metering element 150 may have a respective actuator 180.

During operations, the work vehicle 100 may be towed across a field at some speed (i.e., a ground speed). The control system 140 may generate control signals for operating the electric motor 181 of the metering element 150 at a controlled speed. The speed of the motor 181 may be controlled based, at least partly, on the ground speed of the vehicle 100. Furthermore, the speed of the motor 181 may be controlled based on the type of commodity (e.g., seed type) that is being used and/or based on other factors. As such, the metering element 150 may meter out a predetermined amount of the commodity from the commodity container 128.

Also, in some embodiments, the control system 140 may be in communication with the fan 134 for controlling the airflow system 132. In additional embodiments, the control system 140 may be in communication with a powertrain, transmission, or other similar system for moving the work vehicle 100 across the terrain. For example, if the work vehicle 100 is self-propelled, the control system 140 may communicate with an engine system, a transmission, etc. Otherwise, the control system 140 may communicate with a tractor or other vehicle towing the work vehicle 100 of FIG. 1. It will be appreciated that the control system 140 may be in communication with and may control other systems as well.

The control system 140 may be in communication with one or more sensors of a sensor system 182. The sensor system 182 may be configured to detect one or more conditions associated with operations of the work vehicle 100 and/or the metering system 130. The sensor system 182 may also provide signals to the processor 200 of the control system 140 that correspond to the detected condition. In some embodiments, the sensor system 182 may be wired to the processor 200. In other embodiments, the sensor system 182 may include one or more components that are wirelessly connected to the processor 200.

In some embodiments, the sensor system 182 may include an actuator sensor 184 that is configured to detect the speed (e.g., an angular speed) of the actuator 180 and/or the metering element 150. The actuator sensor 184 may comprise an electrical sensor, an optical sensor, or other type without departing from the scope of the present disclosure. Accordingly, in some embodiments, the control system 140 may control the motor 181 and receive associated feedback from the sensor 184 for closed-loop control of the metering element 150.

In further embodiments, the sensor system 182 may include one or more sensors configured to detect an amount of commodity metered out by the metering system 130, for example, during a calibration procedure to be described in detail below. For example, the sensor system 182 may comprise a scale system 183. The scale system 183 may have various configurations without departing from the scope of the present disclosure. In some embodiments, the scale system 183 may be electronic and may weigh the commodity metered by the metering system 130. Also, the scale system 183 may output an electric signal corresponding to the detected weight to the processor 200 of the control system 140. The scale system 183 may include one or more load cells or other elements for measuring the weight of commodity. This capability may be utilized, for example, when calibrating the metering system 130 as will be discussed.

The sensor system 182 may additionally include at least one ground speed sensor 185. The ground speed sensor 185 may detect the ground speed of the work vehicle 100. Thus, the ground speed sensor 185 may comprise a speedometer in some embodiments. The ground speed sensor 185 may be in communication with the engine control system of a vehicle (e.g., a tractor) that is towing the work vehicle 100 to detect the ground speed of the work vehicle 100. Also, in some embodiments, the ground speed sensor 185 may be operatively connected to a wheel axle, a mechanical transmission, or other component for detecting the ground speed of the work vehicle 100.

Figure 3:
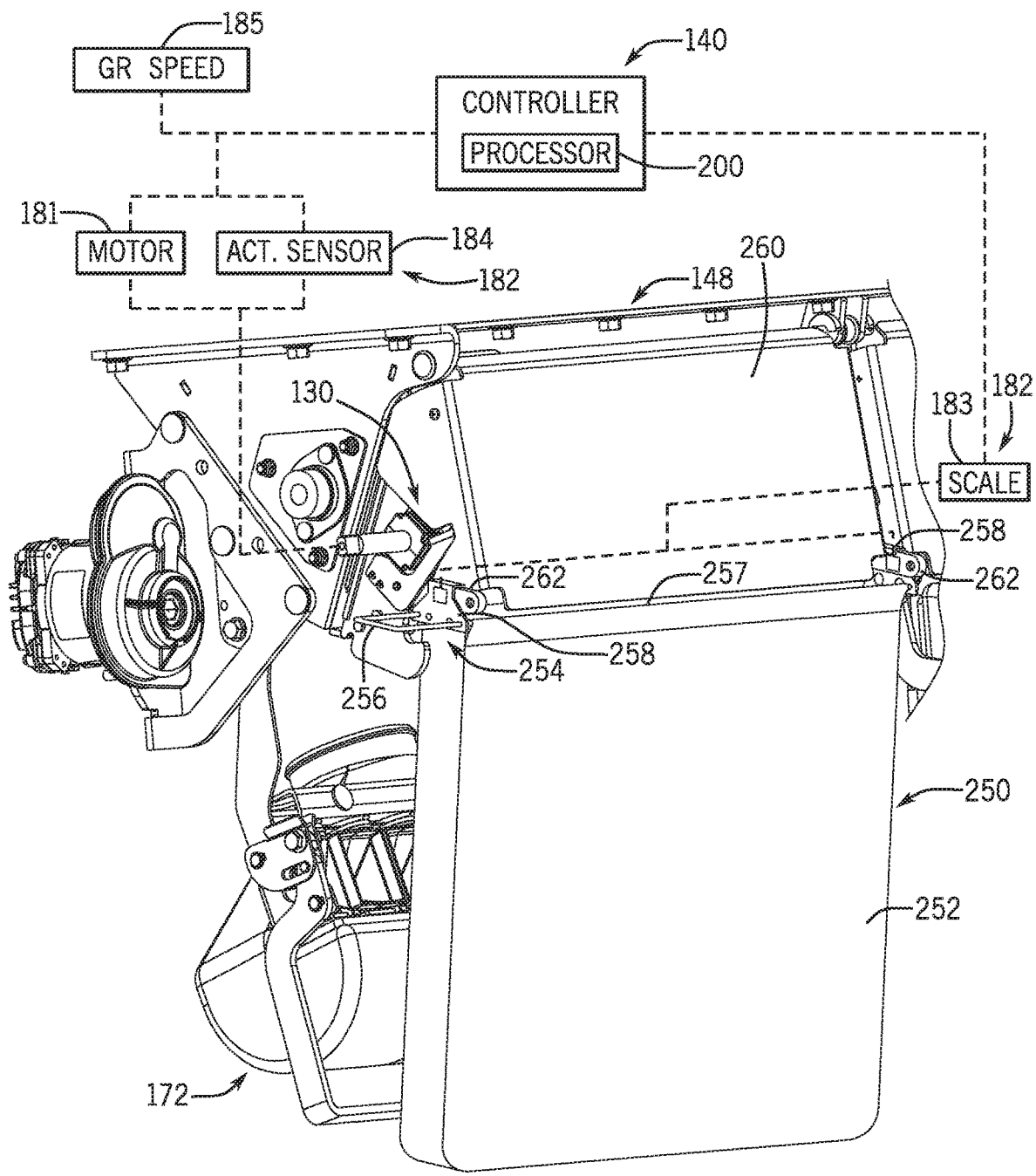
FIG. 3 is a perspective view of the metering system of the work vehicle of FIG. with a receptacle attached according to example embodiments of the present disclosure.

The work vehicle 100 may also include a receptacle 250 as shown in FIG. 3. The receptacle 250 may be used to collect commodity from the metering system 130, for example, during a calibration procedure described in detail below.

The receptacle 250 may include a flexible bag 252 and an attachment structure 254. The bag 250 may be made of a porous or breathable material and may include an open end 257. The attachment structure 254 may removably and temporarily attach the bag 252 to the work vehicle 100. In some embodiments, the attachment structure 254 may include a rigid rim liner 256 that is attached proximate the open end 257 of the bag 252. The liner 256 may be a substantially rigid rod, wire, bar, or other structure that extends continuously and annularly about the open end 257 of the bag 252. The attachment structure 254 may also include one or more brackets 258 that are attached to the liner 256. In some embodiments, there may be at least two brackets 258 that are hook-like. As shown, the brackets 258 may hook onto the work vehicle 100. More specifically, in some embodiments, the brackets 258 may extend over and hook onto an attachment structure 262 of a covering panel 260 of the metering system 130. (The attachment structure 262 may be fixed to the chassis 110 of the work vehicle 100 and may support the covering panel 260 for movement relative to the metering element 150, the commodity tubes 158, etc.) With the brackets 258 of the receptacle 250 attached to the attachment structure 262, the receptacle 250 may be supported by the chassis 110 of the work vehicle 100.

Before attaching the receptacle 250 to the work vehicle 100, one or more components of the work vehicle 100 may need to be moved. For example, the plenum assembly 172 may be moveably mounted below the metering system 130 so as to move from a first position (FIG. 2) to a second position (FIG. 3). When in the second position, the plenum assembly 172 may be spaced away from the commodity tubes 158, leaving the second end 164 of the commodity tubes 158 exposed.

Once the plenum assembly 172 has been moved to the second position (FIG. 3). the brackets 258 of the receptacle 250 may hook onto the attachment structure 262 of the covering panel 260. Thus, the bag 252 may hang from the attachment structure 262. In this position, the open end 257 of the receptacle 250 may be open to receive commodity from the commodity tubes 158 of the metering system 130. In some embodiments, the receptacle 250 may be disposed underneath each of the commodity tubes 158 of the central assembly 148.

Moreover, the receptacle 250 may operatively attach to the scale system 183. Accordingly, the scale system 183 may be configured for weighing the receptacle 250 and the commodity collected therein in a quick and convenient manner. In some embodiments, the scale system 183 may include one or more components that are supported on the attachment structure 262. As such, the scale system 183 may be supported (via the attachment structure 262) by the chassis 110 of the work vehicle 100. The scale system 183 may include a load cell that is supported by the attachment structure 262 of the covering panel 260. In other embodiments, the scale system 183 may include one or more load cells that are incorporated on the receptacle 250. In additional embodiments, the scale system 183 may be remote from the metering system 130 of the work vehicle 100 and/or the receptacle 250.

Figure 4:
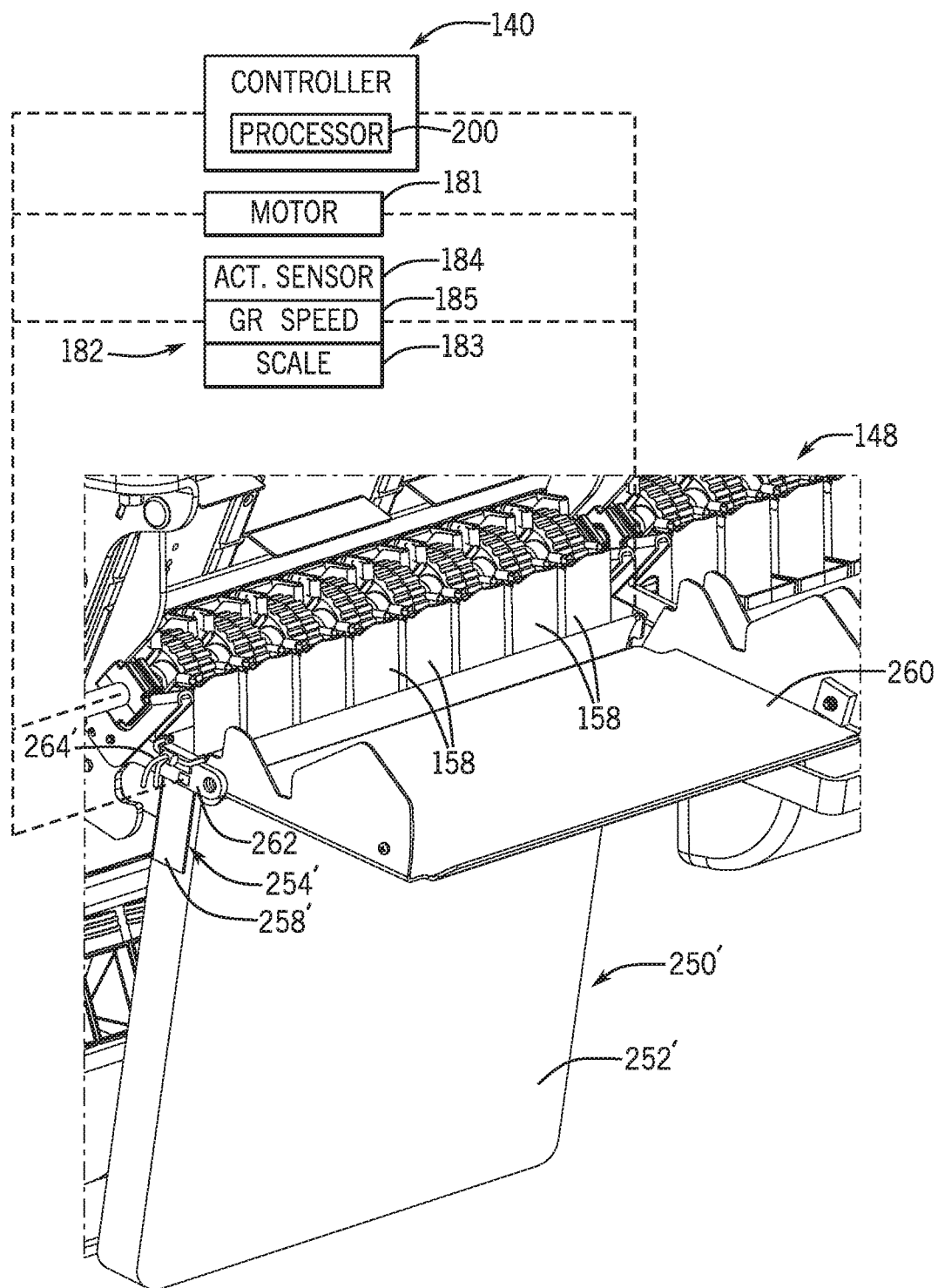
FIG. 4 is a perspective view of the metering system with a receptacle according to additional embodiments of the present disclosure.

FIG. 4 illustrates another embodiment of the receptacle 250'. The receptacle 250' may be substantially similar to the embodiment of FIG. 3, except the receptacle 250' may include a flexible drawstring 264'. The drawstring 264' may be flex for opening the bag 252' and attaching it to the work vehicle 100. The drawstring 264' may also be cinched closed for closing the bag 252'. The brackets 258' may also be different from those shown in FIG. 3. As shown in FIG. 4, the brackets 258' may be hooked on the inside of the attachment structure 262 of the covering panel 260 unlike the brackets 258 of FIG. 3, which hook over the outside of the attachment structure 262.

It will be appreciated that the receptacle 250, 250' may vary from the illustrated embodiments without departing from the scope of the present disclosure. Also, some features of FIG. 3 may be combined with features of FIG. 4. For example, in some embodiments, the receptacle may include the brackets 258 of FIG. 3, and the receptacle may include the flexible drawstring 264' of FIG. 4.

Figure 5:
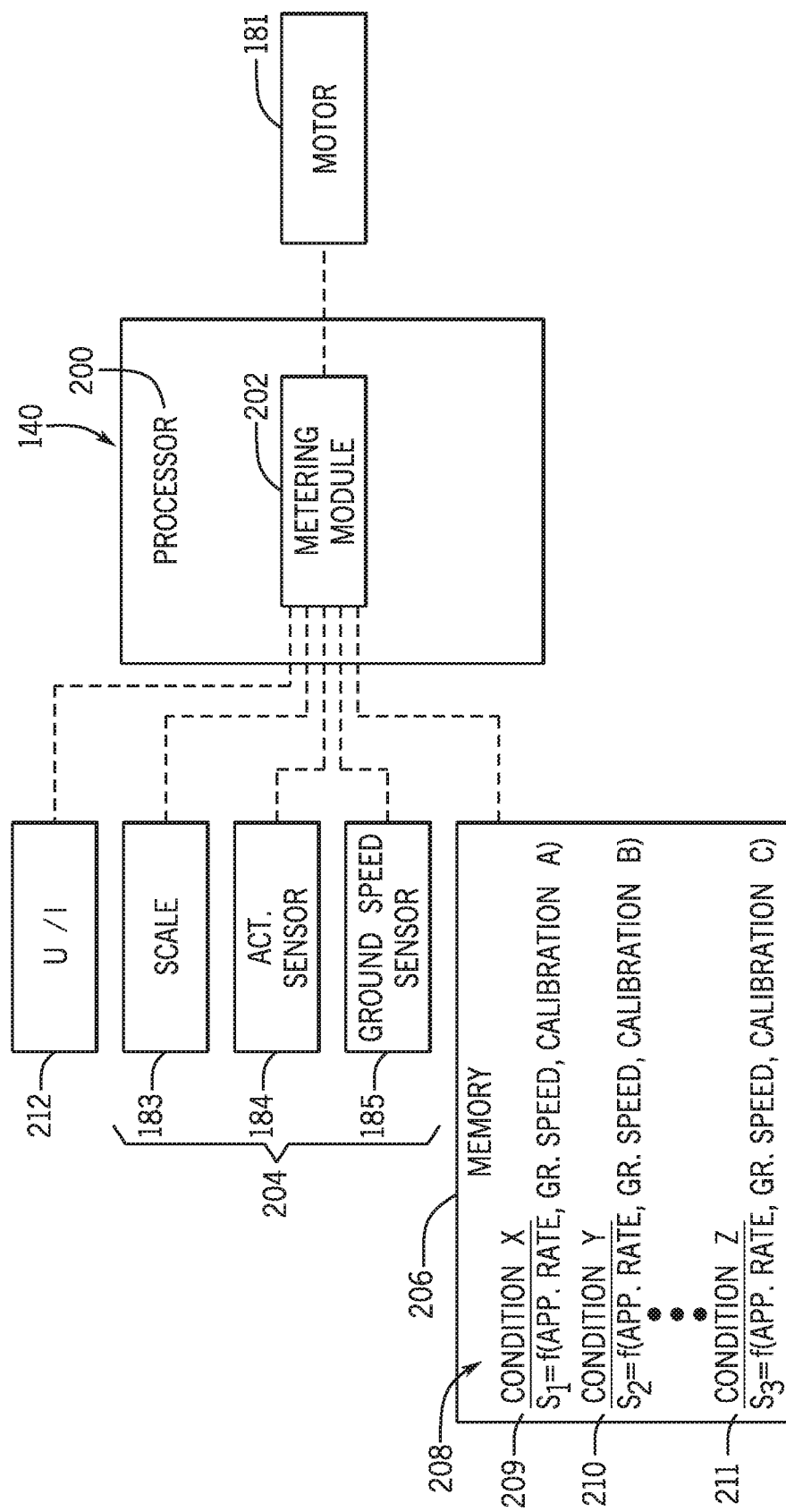
FIG. 5 is a schematic diagram of a control system of the work vehicle of FIG. according to example embodiments.

The control system 140 is shown in more detail in FIG. 5 according to example embodiments. It will be understood that FIG. 5 is a simplified representation of the control system 140 for purposes of explanation and ease of description, and FIG. 5 is not intended to limit the application or scope of the subject matter in any way. Practical embodiments of the control system 140 may vary from the illustrated embodiment without departing from the scope of the present disclosure. Also, the control system 140 may include numerous other devices and components for providing additional functions and features, as will be appreciated in the art.

The control system 140 may include a processor 200. The processor 200 may comprise hardware, software, and/or firmware components configured to enable communications and/or interaction between the sensor system 204, the motor 181, a memory element 206, and a user interface (U/I) 212. The processor 200 may also perform additional tasks and/or functions described in greater detail below. Depending on the embodiment, the processor 200 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 200 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 200 includes processing logic that may be configured to carry out the functions, techniques, and processing tasks associated with the operation of the control system 140. Furthermore, the steps of a method or algorithm described in connection with the embodiments disclosed herein may be embodied directly in hardware, in firmware, in a software module executed by the processor 200, or in any practical combination thereof.

The processor 200 may have a metering module 202. The metering module 202 may be configured for calibrating the metering system 130. The metering module 202 may also be configured for determining operating conditions of the metering system 130. As shown, the metering module 202 may be in communication with the sensor system 204, the U/I 212, and the memory element 206.

The U/I 212 may be of any suitable type. In some embodiments, the U/I 212 may include one or more input devices with which the user may enter user commands or other input. For example, in some embodiments, the U/I 212 may include a keyboard, a mouse, a touch-sensitive surface, a stylus, and/or another input device. The U/I 212 may also include one or more output devices for providing output to the user. In some embodiments, the U/I 212 may include a display, a printer, an audio speaker, a tactile feedback device, or the like. Accordingly, with the U/I 212, the user may input the desired application rate (e.g., measured in pounds of commodity per acre), the commodity type (e.g., the type of seed) that is loaded within the commodity container 128, the date, the time, weather conditions, soil conditions, or other information. The U/I 212 may also output a message, alert, or other information to the user regarding operation of the metering system 130.

The memory element 206 may be realized as RAM memory, flash memory, EPROM memory, EEPROM memory, registers, a hard disk, a removable disk, a CD-ROM, or any other form of storage medium known in the art. In this regard, the memory element 206 can be coupled to the processor 200 such that the processor 200 can read information from, and write information to, the memory element 206. In the alternative, the memory element 206 may be integral to the processor 200. As an example, the processor 200 and the memory element 206 may reside in an ASIC.

In some embodiments, the memory element 206 may include a plurality of datasets 208 stored thereon. In some embodiments, the plurality of datasets 208 may include a first dataset 209, a second dataset 210, and a third dataset 211. However, it will be appreciated that there may be any number of datasets 208 stored on the memory element 206. The datasets 208 may include a plurality of correlated variables. There may be different datasets 208 for different operating conditions of the work vehicle 100 in some embodiments. In some embodiments, the datasets 208 may include stored mathematical functions, calibration curves, look-up tables, mathematical models, or other tools. The datasets 208 may be created and saved, generated, compiled, etc., from testing data, from user programming of the control system 140, or otherwise. As will be discussed, the metering module 202 of the processor 200 may rely on at least one of the datasets 208 to ultimately determine how fast to rotate the metering element 150 during planting, seeding, or related operations. More specifically, the metering module 202 may determine the angular speed of the metering element 150 based on: (a) the desired application rate for the commodity; (b) the ground speed of the vehicle 100; and/or (c) a calibration relationship.

As shown, the first dataset 209 may express an angular speed, S1, of the metering element 150 as a function of the desired commodity application rate, the current ground speed, and a calibration factor (identified as "Calibration A"). The second dataset 210 may similarly express the angular speed, S2, of the metering element 150 as a function of the desired application rate, the current ground speed, and another calibration factor (identified as "Calibration B"). Also, the third dataset 211 may similarly express the angular speed, S3, of the metering element 150 as a function of the desired application rate, the current ground speed, and another calibration factor (identified as "Calibration C"). Also, the first dataset 209 may be associated with "CONDITION X". The second and third datasets 210, 211 may be associated with "CONDITION Y" and "CONDITION Z", respectively. The conditions (X, Y, and Z) may represent different operating conditions of the work vehicle 100, such as different commodity-types within the container 128, different weather conditions, or otherwise.

It will be appreciated that the speed of the metering element 150 affects the rate at which the commodity moves from the container 128 and through the metering system 130. In some embodiments, there may be a substantially linear relationship between the speed of the metering element 150 and the metering rate. However, in many cases, there may be a nonlinear relationship between the speed of the metering element 150 and the rate at which the metering system 130 meters the commodity. The calibration factors within the datasets 209, 210, 211 may account for these nonlinear relationships. The control system 140 may also generate these calibration relationships for the particular metering element 150 of the work vehicle 100. Thus, the control system 140 and/or other features of the work vehicle 100 may calibrate the metering element 150 with a high degree of precision.

The calibration factors may be a respective mathematical expression, model, function, graph, look-up table, function, etc. that expresses how the speed of the metering element 150 affects the commodity output by the metering system 130. In some embodiments, the calibration relationship establishes an approximate mass of commodity that is dispensed per revolution of the metering element 150. The calibration factor for the first dataset 209 is shown as a line graph in the example embodiment of FIG. 6. As shown, the relationship is generated from several datapoints 280, 282, 284, 286, 288, which collectively define a nonlinear relationship between the amount of commodity metered out by the metering system 130 for a given speed of the metering element 150. FIG. 7 illustrates an example of the calibration factor of the second dataset 210. The relationship is defined by datapoints 290, 292, 294, 296, 298. Although not illustrated, the calibration factor of the third dataset 211 may be different from those shown in FIGS. 6 and 7. It will be appreciated that these calibration relationships are mere examples and that the control system 140 may rely on other calibration relationships without departing from the scope of the present disclosure.

Figure 8:
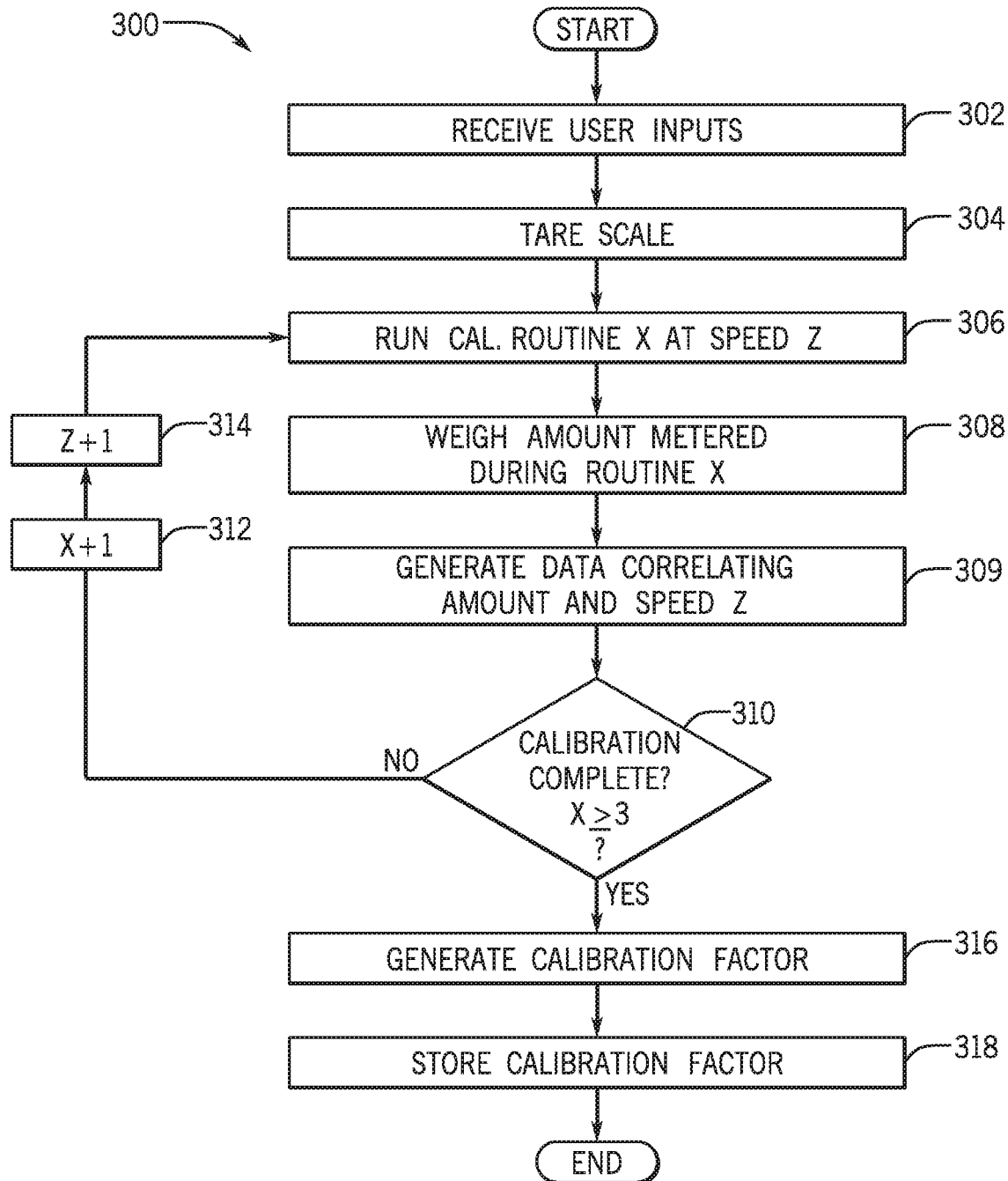
FIG. 8 is a flowchart illustrating a method of calibrating the metering system of the work vehicle of FIG. 1.

The processor 200 of the control system 140 may generate these calibration factors during a calibration method, such as the method 300 represented in FIG. 8. The calibration method 300 may be completed quickly and conveniently and may accurately calibrate the metering system 130.

Before the method 300 begins, the user may move the plenum assembly 172 downward and away from the metering system 130. Then, the receptacle 250 may be hung from the work vehicle 100, for example, as shown in FIGS. 3 and 4. Then, the user may initiate the calibration method 300.

In some embodiments, the method 300 may begin at 302. Specifically, the user may utilize the U/I 212 and input a user command to initiate the calibration process. The user may also input the type of commodity (e.g., seed-type, etc.) that will be metered through the metering system 130 during the calibration method 300. Also, the user may input the date, time, weather conditions, or other information.

Then, at 304, the processor 200 may tare the scale system 183 such that the weight of the receptacle 250 can be disregarded when weighing commodity therein. Specifically, the scale system 183 may weigh the empty receptacle 250 to obtain the receptacle weight. In some embodiments, the scale system 183 may be zeroed with the receptacle 250 still attached such that the receptacle weight is disregarded during future weight measurements. In other embodiments of 304, the weight of the receptacle 250 obtained at 304 may be saved in the memory element 206 so that the processor may subtract the detected receptacle weight from future weight measurements.

Next, at 306, the processor 200 may run a first calibration routine (indicated as X) with the metering element 150 rotating at a first predetermined speed (indicated as Z). Specifically, the processor 200 may prompt the motor 181 to rotate the metering element 150 at the first predetermined angular speed for a predetermined amount of time, for a predetermined number of revolutions, etc. As a result, the metering system 130 may meter out a first amount of the commodity into the receptacle 250.

Subsequently, at 308, the processor 200 may prompt the scale system 183 to detect the weight of the commodity metered into the receptacle 250 during this first calibration routine (X). In some embodiments, the scale system 183 has been tared (at 304) such that the weight of the receptacle 250 is disregarded at 308. The scale system 183 may send a corresponding signal to the processor 200 and save this first weight measurement in the memory element 206. In other embodiments, the scale system 183 may detect the combined weight of the commodity and the weight of the receptacle 250 at 308 and send a corresponding signal to the processor 200. The processor 200 may then subtract the weight of the receptacle (obtained at 304) and save the difference (i.e., the first measurement) in the memory element 206.

At 309, the metering module 202 may generate a first datapoint (i.e., first data) that correlates the weight of the commodity (obtained at 308) with the speed (Z) of the metering element 150 during this first calibration routine.

Next, at 310, the processor 200 may determine whether there have been enough calibration routines performed and whether there is sufficient data to generate the calibration factor. In some embodiments, the method 300 may include performing at least three calibration routines (i.e., X≥3). In the present example, there has only been one routine (X=1); therefore, the processor 200 makes a negative determination at 310, and the method 300 continues to 312. At 312, the processor 200 increments the routine number by one (X=2). Then, at 314, the processor 200 changes the speed setting (Z) for the metering element 150 (Z=2). Then, the method 300 loops back to 306.

During this repeat of 306, a second calibration routine may be performed with the metering element 150 rotating at the second predetermined speed (Z=2) for a predetermined amount of time, for a predetermined number of revolutions, etc. Then, at 308, the processor 200 may prompt the scale system 183 to detect the weight of the commodity metered into the receptacle 250 during the second calibration routine. The processor 200 may compute the difference in weight from the previous calibration routine, for example, by subtracting the first weight measurement (obtained at the first occurrence of 308) and save the difference (i.e., the second measurement) in the memory element 206.

Again at 309, the metering module 202 may generate a second datapoint (i.e., second data) that correlates the weight of the commodity (obtained at the second occurrence of 308) with the speed (Z=2) of the metering element 150 during this second calibration routine.

The method 300 may continue at 310. Here, there have been only two calibration routines (X=2). Therefore, the processor 200 may increment the routine number by one (X=3) at 312 and change the speed setting for the metering element (Z=3) at 314.

With the method 300 looping back to 306, the third calibration routine may be performed with the metering element 150 rotating at the third predetermined speed (Z=3) for a predetermined amount of time, for a predetermined number of revolutions, etc. Then, at 308, the scale system 183 may prompt the scale system 183 to weigh the amount of commodity metered into the receptacle 250 during the third calibration routine. In some embodiments, the processor 200 may subtract the second weight measurement (obtained at the second occurrence of 308) and save the difference (i.e., the third measurement) in the memory element 206.

Next at 309, the metering module 202 may generate a third datapoint (i.e., third data) that correlates the weight of the commodity (obtained at the third occurrence of 308) with the speed (Z=3) of the metering element 150 during this third calibration routine.

The method 300 may continue at 310. In this example, there have been three calibration routines performed (X=3). Therefore, in some embodiments, the method 300 may continue to 316 instead of looping back to 306 to perform another calibration routine. However, it will be appreciated that the method 300 may include performing any number of calibration routines. This limit may be preset within the metering module 202 of the processor 200.

Figure 6:
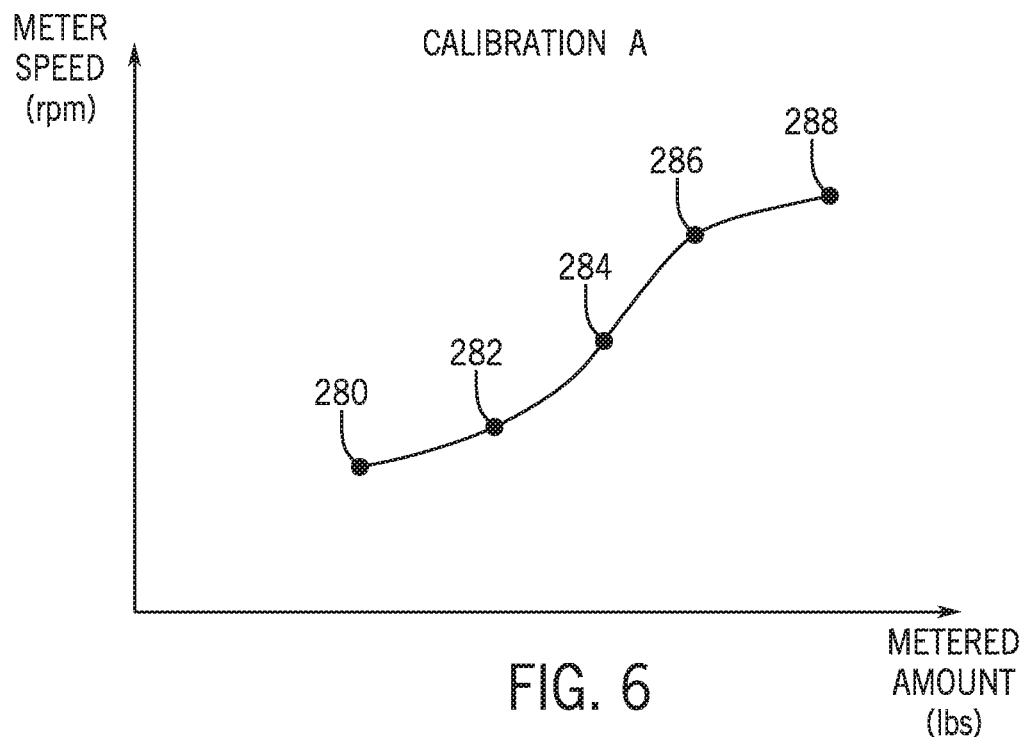
FIG. 6 is a graph illustrating a first calibration factor for the metering system of the work vehicle of FIG. 1.
Figure 7:
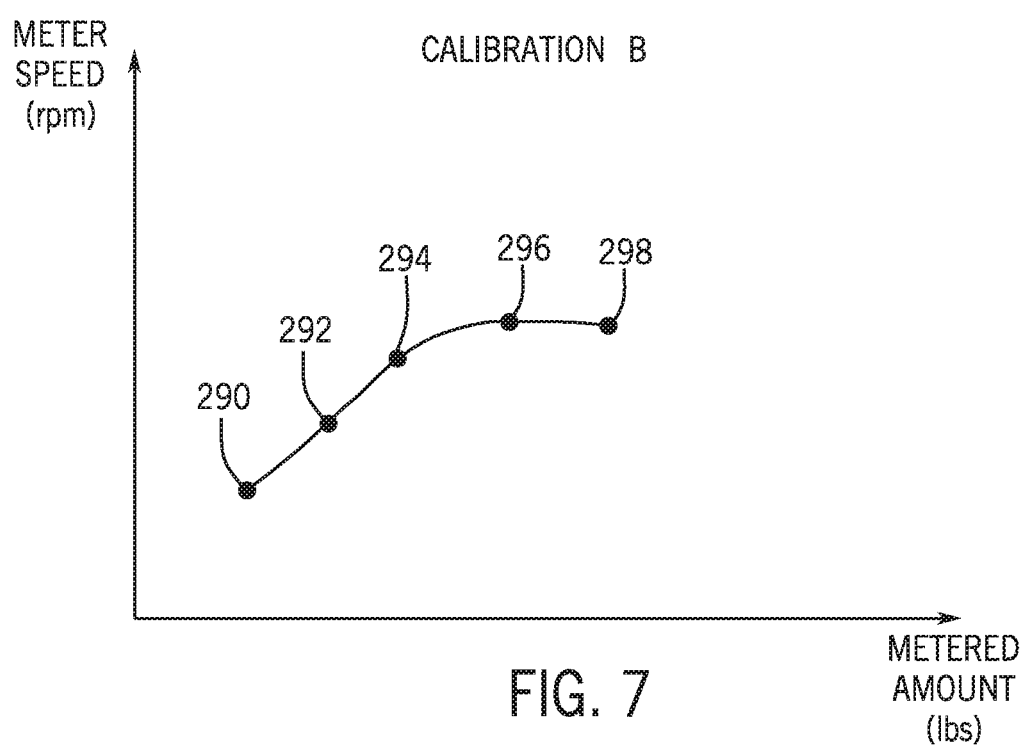
FIG. 7 is a graph illustrating a second calibration factor for the metering system of the work vehicle of FIG. 1.

At 316, the processor 200 may generate the calibration factor (e.g., like the calibration factors illustrated in FIGS. 6 and 7). For example, in the present example, three datapoints have been generated (during the three occurrences of 309). The three datapoints may be collected and compiled, for example, as a line graph (e.g., FIGS. 6 and 7) or as another model, relationship, etc. In some embodiments, the calibration factor may be associated with one or more inputs (e.g., the commodity type, weather conditions, etc.) entered by the user at 302. Then, at 318 of the method 300, the calibration factor may be saved in the memory element 206, and the calibration method 300 may terminate.

At this point, the user may detach the receptacle 250 from the work vehicle 100 and empty the collected commodity back into the commodity container 128. Also, the user may replace the plenum assembly 172 back into its original position, proximate the metering system 130 so that normal seeding, planting, etc. operations may be resumed.

The calibration method 300 of FIG. 8 may be repeated several times for different operating conditions (e.g., for different commodity types, under different weather conditions, etc.). Accordingly, calibration factors may be collected for different operating conditions of the work vehicle 100. Also, the calibration method 300 may be repeated each time the commodity container 128 is filled since the commodity density may vary from load-to-load.

It will be appreciated that the calibration method 300 provides significant convenience and time savings for the user. Accordingly, the metering system 130 may be calibrated, for example, when the container 128 is first filled with a fresh batch of commodity. Then, the work vehicle 100 can be used for seeding, fertilizing, etc. with the metering system 130 operating according to the newly-generated calibration factor for that particular batch of commodity. Accordingly, the metering system 130 may accurately provide the desired application rate for the particular commodity. When new commodity is loaded into the container 128, the metering system 130 may be calibrated again using the method 300 such that the metering system 130 may operate according to a fresh calibration factor.

In other embodiments, the method 300 may be used to generate calibration factors for a particular commodity type (e.g., a particular seed type, a particular particulate size of the commodity, etc.). The calibration factor may be associated with that particular commodity type and stored in the memory element 206. Then, whenever the work vehicle 100 is used for distributing that commodity type in the future, the stored calibration factor may be used. The calibration factors may be generated and associated with other operating conditions stored in the memory element 206, and the stored calibration factor may be used in the future when similar operating conditions exist.

It will be appreciated that the calibration method 300 may occur in a variety of ways without departing from the scope of the present disclosure. For example, the metering element 150 may run at 306 and stop at 308 while the scale system 138 weighs the metered commodity. Then, the metering element 150 may resume rotating at a different speed as the method 300 loops back to 306, and so on. In another embodiment, the control system 140 may keep the metering element 150 rotating continuously as the method 300 loops between 306 and 310. In this case, the metering element 150 may accelerate during this continuous run, the scale system 138 may instantaneously weigh the commodity within the receptacle 250 several times as the metering element 150 accelerates, and the different weights may be associated with the approximate instantaneous speed of the metering element 150 when the weight was measured.

Figure 9:
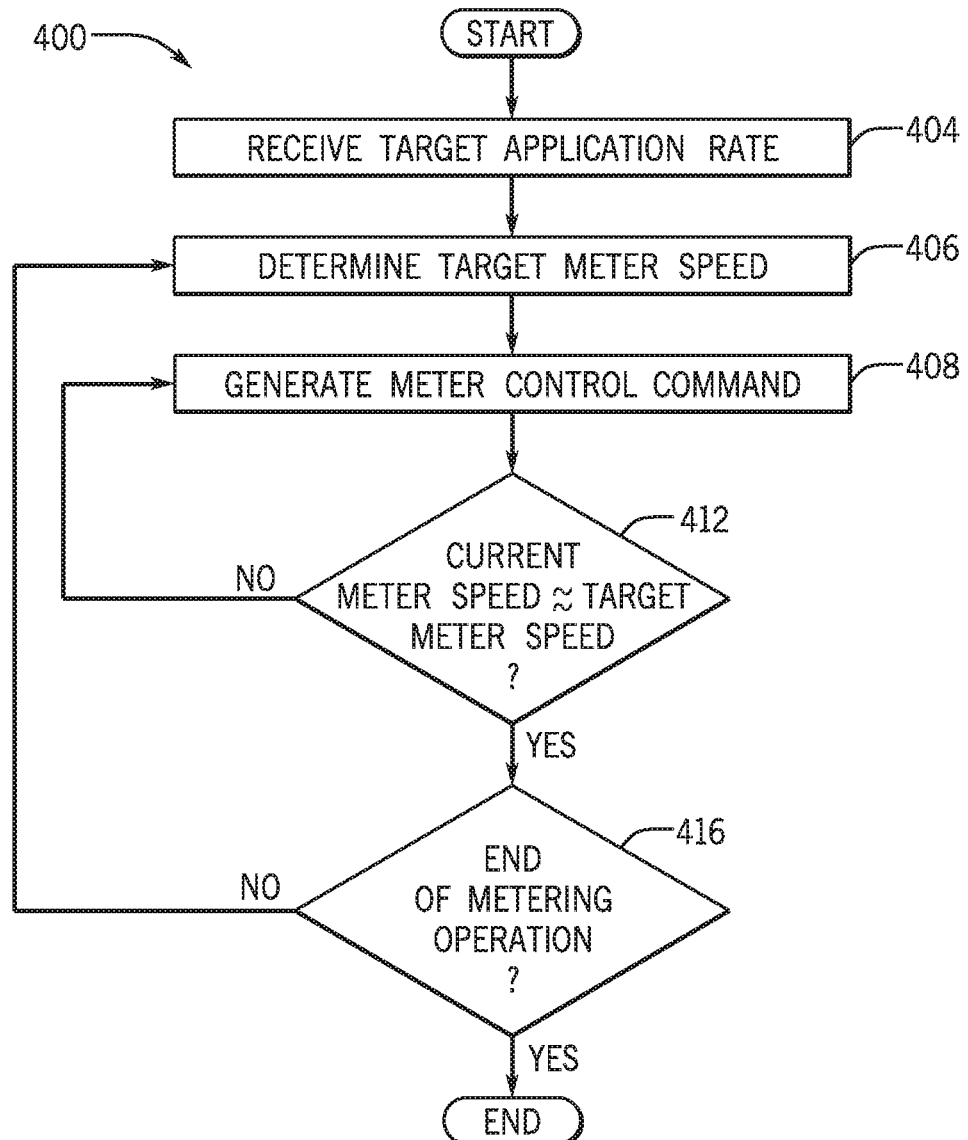
FIG. 9 is a flowchart illustrating a method of operating the metering system of the work vehicle of FIG. 1.

Once the calibration relationship has been established, the control system 140 may operate the metering system 130 accordingly. For example, the control system 140 may employ the method 400 of operating the metering system 130 shown in FIG. 9.

The method 400 may begin at 404, in which the user may input the target (i.e., desired) application rate for the commodity. The user may decide on the target application rate based on the commodity type, based on the soil conditions, and other factors. The U/I 212 may be used to provide the input at 404 of the method 400. At this point, the work vehicle 100 may be ready to begin the seeding or planting operation.

Next, at 406, the processor 200 may determine a target speed of the metering element 150. Specifically, the metering module 202 may receive a signal corresponding to the target application rate entered at 404. The metering module 202 may also receive a signal from the ground speed sensor 185 indicating the current ground speed condition of the vehicle 100. (The ground speed may be a set ground speed of the vehicle 100 or may be a variable ground speed.) Moreover, the metering module 202 may access the memory element 260 to obtain the appropriate calibration factor generated using the method 300 and described above. From these inputs, the metering module 202 may determine the target speed of the metering element 150.

Once the target meter speed is established, the method 400 may continue at 408, wherein the metering module 202 may generate a control command for the motor 181 of the metering element 150. Next, the processor 200 may determine, at 412, whether the current speed of the metering element 150 is approximately equal to the target speed determined at 406. The processor 200 may make this determination according to output from the actuator sensor 184. If not, then the method 400 may loop back to 408 and generate meter control commands for changing the speed of the motor 181. Accordingly, the motor 181 can speed up or slow down rotation of the metering element 150.

When, at 412, the processor 200 determines that the current speed of the metering element 150 is approximately equal to the speed determined at 406, the method 400 may continue at 416. At 416, the control system 140 may determine whether the seeding/planting operation is complete. In many cases, the operation may continue for a significant time, and the speed of the work vehicle 100 may vary during the process. In this case, the method 400 may loop back to 406 and the metering module 202 may determine a new target meter speed for the metering element 150. The metering module 202 may rely on the same calibration factor used previously; however, assuming that the ground speed of the vehicle 100 has changed, the target meter speed for the metering element 150 may change. The method 400 may continue as described above, until the metering operation is complete (i.e., 416 answered affirmatively). Then, the method 400 may terminate.

Accordingly, the metering system 130, the calibration method 300, and the operation method 400 may allow the work vehicle 100 to provide a substantially consistent and accurate application rate for the commodity. Also, the system 130 and methods 300, 400 may be substantially automated to provide convenience for the user.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method of calibrating a metering system for a work vehicle, the method comprising:
performing, by a control system having at least one processor, a first calibration routine in which a metering element operates at a first speed, a second calibration routine in which the metering element operates at a second speed, and a third calibration routine in which the metering element operates at a third speed;

receiving, by the control system, a first measurement related to a first amount of a commodity metered out by the metering element during the first calibration routine, a second measurement related to a second amount of the commodity metered out by the metering element during the second calibration routine, and a third measurement related to a third amount of the commodity metered out by the metering element during the third calibration routine;

generating, by the control system, first data correlating the first measurement to the first speed, second data correlating the second measurement to the second speed, and third data correlating the third measurement to the third speed;

determining, by the control system, a calibration factor for operating the metering element based on the first data, the second data, and the third data;

generating, by the control system, a control command for the metering element according to the calibration factor; and operating, by the control system, the metering element according to the control command.

2. The method of claim 1, further comprising receiving, by the control system, a target application rate for the work vehicle; and
wherein generating the control command includes generating the control command according to the calibration factor and the target application rate.

3. The method of claim 2, wherein operating the metering element includes varying an angular speed of the metering element according to the control command.

4. The method of claim 2, further comprising receiving, by the control system, a ground speed signal relating to a ground speed condition of the work vehicle; and
wherein generating the control command includes generating the control command according to the calibration factor, the target application rate, and the ground speed signal.

5. The method of claim 1, wherein performing the first calibration routine includes operating the metering element to dispense the first amount into a receptacle;
wherein performing the second calibration routine includes operating the metering element to dispense the second amount into the receptacle with the first amount such that the receptacle holds a combined amount;
further comprising operating, by the control system, a scale to weigh the first amount to obtain a first weight;
further comprising operating, by the control system, the scale to weigh the combined amount to obtain a combined weight;
further comprising subtracting, by the at least one processor, the first weight from the combined weight to identify a second weight; and
wherein the first measurement corresponds to the first weight and wherein the second measurement corresponds to the second weight.

6. The method of claim 5, further comprising taring the scale system of a weight of the receptacle.

7. The method of claim 1, further comprising:
receiving, by the control system, a commodity-type input indicative of the type of commodity metered in the first, second, and third calibration routines; and
associating, by the control system, the calibration factor with the type of commodity indicated in the commodity-type input.

8. A work vehicle comprising:
a metering system that includes a metering element configured to meter a commodity through the metering system;
a sensor system; and
a control system with at least one processor, the control system configured to:
perform a first calibration routine in which the metering element operates at a first speed, a second calibration routine in which the metering element operates at a second speed, and a third calibration routine in which the metering element operates at a third speed;
receive a first measurement, a second measurement, and a third measurement from the sensor system, the first measurement related to a first amount of a commodity metered out by the metering element during the first calibration routine, the second measurement related to a second amount of the commodity metered out by the metering element during the second calibration routine, and the third measurement related to a third amount of the commodity metered out by the metering element during the third calibration routine;
generate first data correlating the first measurement to the first speed, second data correlating the second measurement to the second speed, and third data correlating the third measurement to the third speed;
determine a calibration factor for operating the metering element based on the first data, the second data, and the third data;
generate a control command for the metering element according to the calibration factor; and
operate the metering element according to the control command.

9. The work vehicle of claim 8, further comprising a user interface;
further comprising an actuator that actuates the metering element;
wherein the control system is configured to receive, via the user interface, a target application rate for the work vehicle;
wherein the control system is configured generate the control command for the actuator according to the calibration factor and the target application rate; and
wherein the control system is configured to vary a speed of the actuator according to the control command.

10. The work vehicle of claim 9, wherein the actuator is an electric motor.

11. The work vehicle of claim 9, wherein the control system is configured to receive a ground speed signal relating to a current ground speed condition of the work vehicle; and
wherein the control system is configured to generate the control command according to the calibration factor, the target application rate, and the ground speed signal.

12. The work vehicle of claim 8, wherein the sensor system includes a scale that is supported on the work vehicle.

13. The work vehicle of claim 12, further comprising a receptacle configured to removably attach to the scale and receive the first amount, the second amount, and the third amount of the commodity.

14. The work vehicle of claim 13, wherein the receptacle includes a rigid rim liner and a bag that is supported by the rigid rim liner, wherein the rigid rim liner is configured to hang on the scale.

15. The work vehicle of claim 13, wherein the receptacle includes a drawstring and a bag that is supported by the drawstring, wherein the drawstring is configured to hang on the scale.

16. The work vehicle of claim 13, wherein the control system is configured to:
  operate the metering element to dispense the first amount into the receptacle during the first calibration routine, and operate the metering element to dispense the second amount into the receptacle with the first amount during the second calibration routine such that the receptacle holds a combined amount;
  operate the scale to weigh the first amount to obtain a first weight;
  operate the scale to weight the combined amount to obtain a combined weight;
  subtract the first weight from the combined weight to identify a second weight; and
  wherein the first measurement corresponds to the first weight and wherein the second measurement corresponds to the second weight.

17. The work vehicle of claim 16, wherein the control system is configured to tare the scale of a weight of the receptacle.

18. The work vehicle of claim 8, further comprising a user interface;
  wherein the control system is configured to receive, via the user interface, a commodity-type user input indicative of the type of commodity metered in the first, second, and third calibration routines; and
  wherein the control system is configured to associate the calibration factor with the type of commodity indicated in the commodity-type input.

19. A method of calibrating a metering system for a work vehicle, the metering system including an electric motor and a metering roller, the method comprising:
  performing, by a control system having at least one processor, a first calibration routine in which the metering roller rotates at a first angular speed, a second calibration routine in which the metering roller rotates at a second angular speed, and a third calibration routine in which the metering roller rotates at a third angular speed;
  receiving, by the control system from a scale of the work vehicle, a first weight of a first amount of a commodity metered out by the metering roller during the first calibration routine, a second weight of a second amount of the commodity metered out by the metering element during the second calibration routine, and a third weight of a third amount of the commodity metered out by the metering element during the third calibration routine;
  generating, by the control system, first data correlating the first weight to the first angular speed, second data correlating the second weight to the second angular speed, and third data correlating the third weight to the third angular speed;
  determining, by the control system, a calibration factor for operating the electric motor and the metering roller based on the first data, the second data, and the third data;
  storing, in a memory element, the calibration factor;
  generating, by the control system, a control command for the electric motor according to the stored calibration factor; and
  rotating the metering roller according to the control command.

20. The method of claim 19, further comprising receiving, by the control system, a target application rate for the work vehicle;
  receiving, by the control system, a ground speed signal relating to a ground speed condition of the work vehicle; and
  wherein generating the control command includes generating the control command according to the received target application rate, the received ground speed signal, and the stored calibration factor.

* * * * *